Aug. 23, 1955 E. L. C. WHITE 2,716,152

REMOTE CONTROL FOR TELEVISION CAMERA

Filed March 28, 1950

Inventor
ERIC LAWRENCE CASLING WHITE
By Ralph E. Atherton
Attorney 2,716,152
Patented Aug. 23, 1955

2,716,152

REMOTE CONTROL FOR TELEVISION CAMERA

Eric Lawrence Casling White, Iver, England, assignor to Electric & Musical Industries Limited, Hayes, England, a company of Great Britain Application March 28, 1950, Serial No. 152,425

2 Claims. (Cl. 178—6)

Figure 1:
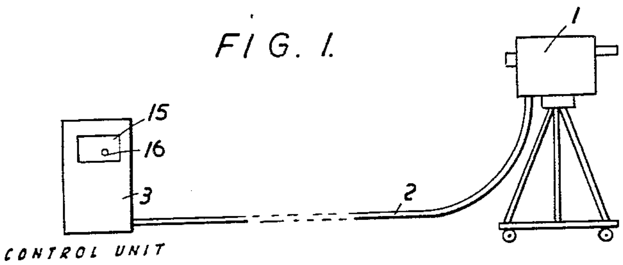

This invention relates to electrical apparatus for effecting a control at a remote point such as for controlling the operation of a television camera which is connected by a cable to a control unit.

In certain types of television cameras which embody pick-up tubes it is necessary to employ a high voltage on one or more of the electrodes of the tube. For example, in certain types of pick-up tubes the target electrode thereof is scanned by a high-velocity beam of electrons and in order to generate such a high-velocity beam the cathode and control electrode of the pick-up tube may be required to be maintained at about 1500 volts negative with respect to earth. The camera is connected by cable to control and supply equipment and in order to reduce the size of the camera cable and the cable connectors and to improve reliability under humid conditions it is desirable to maintain the potentials on the cable at a low voltage say under 350 volts and to generate the high voltage necessary for operating the pick-up tube by the provision of suitable circuits at the camera. Although it is possible to generate the required high voltage at the camera, nevertheless, it is still necessary to be able to control the operation of the pick-up tube from a point remote from the camera.

The object of the present invention is to provide an arrangement whereby a pick-up tube operated by a high voltage generated at the camera can be controlled from a remote point without the necessity of transmitting a high voltage along the camera cable.

According to one feature of the invention, there is provided electrical apparatus for effecting a control at a remote point comprising means for generating an electrical control signal having recurrent peak extremities forming pulses, means for adjusting the amplitude of said signal, means for feeding said signal to said remote point through a circuit arranged to exclude the direct current component of said signal, means at the remote point for setting the peaks of said signal at a fixed level, and means for applying at said remote point variations in said signal from said fixed level due to said adjustment in amplitude to effect a control at said point.

With tubes of the type above-mentioned it is desirable to be able to control the beam current of the tube from a point remote from the camera and the present invention provides a convenient way of controlling the beam current by utilising a pulse waveform which it is usually necessary to transmit along the cable for blacking out the electron beam of the pick-up tube during line and frame flyback periods.

According, therefore, to another feature of the invention, there is provided television camera apparatus including a television camera which is connected by cable to a control unit and which comprises means at the camera end of said cable for generating a high D. C. voltage for operating the pick-up tube of said camera, means for isolating said high voltage for said cable, means for feeding along said cable and through said isolating means an A. C. waveform, said isolating means causing said A. C. waveform to lose its D. C. component, a unidirectionally conducting device having one electrode connected to said D. C. voltage generating means and another electrode connected to said cable between said isolating means and said pick-up tube, thereby to restore said D. C. component at a voltage corresponding substantially to said high voltage, and means for utilizing said waveform with said restored D. C. component to control the operation of said pick-up tube.

According, therefore, to another feature of the invention, there is provided television camera apparatus including a television camera connected by cable to a control unit, means at said control unit for generating an electrical control signal having recurrent peak extremities forming pulses, means at said control unit for adjusting the amplitude of said signal and for transmitting said signal along said cable, means at the camera end of said cable for generating a high direct current voltage for operating the pick-up tube of said camera, means for isolating said high voltage from said cable, means at the camera end of said cable for setting the peaks of said signal at a fixed level corresponding substantially to said high direct current voltage, and means for applying at the camera end of said cable variations in said signal from said fixed level due to said adjustment in amplitude to effect a control at said camera.

Figure 2:
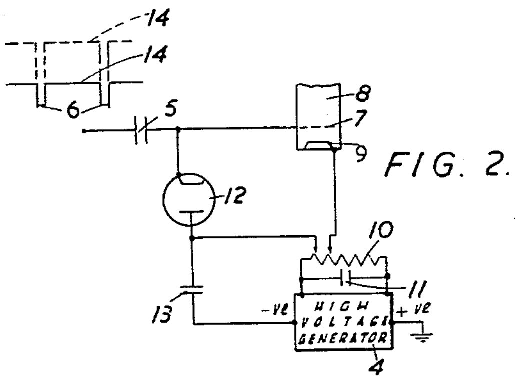

In order that the said invention may be clearly understood and readily carried into effect it will now be more fully described with reference to the accompanying drawings, in which:

Figure 1 illustrates diagrammatically a television camera which is connected by a cable to a control unit, and Figure 2 illustrates a part of the circuit embodying the invention.

As shown in Figure 1, the reference numeral 1 indicates a television camera which is connected by a cable 2 to a control unit 3 as is usual in the art. The pick-up tube employed in the camera 1 is a tube which depends for its operation on the use of high D. C. voltages which it is not desired to transmit from the unit 3, through the cable 2 for the reasons above mentioned. Accordingly, the required high voltages are generated at the camera in any suitable manner such as by rectifying and smoothing the high voltages which are set up across the scanning coils of the pick-up tube during line and frame flyback periods. In Figure 2 of the drawings the circuit for generating the high voltages is indicated at 4 and to prevent the high voltages generated from being transmitted along the cable 2 the high voltage generator 4 is isolated from the cable by means of a condenser 5 or by means of a transformer. In operating the camera 1 it is necessary to black out the electron beam of the tube during line and frame flyback periods for which purpose the control unit 3 is arranged to transmit along the cable 2 to the camera 1 pulses of rectangular form which are indicated in Figure 2 by the reference numeral 6. These pulses are applied to the control electrode 7 of the pick-up tube of the camera, a portion of the tube being indicated at 8. The tube 8 in the embodiment shown is one employing a high-velocity beam of electrons and to generate such high-velocity beam the cathode 9 of the tube and the control electrode 7 are normally maintained at a potential of about 1500 volts negative with respect to earth. The high voltage generator 4 is therefore arranged to generate such a high negative voltage which is applied to the cathode 9 through a potential divider 10 the voltage being smoothed by a condenser 11. The black out pulses 6 are transmitted through the isolating condenser 5 to the control electrode of the tube 8 and in order for these pulses to be capable of blacking out the electron beam it is necessary for said pulses to have a sufficient amplitude in the negative sense to enable such blacking out to be effected. The pulses 6 are not transmitted along the cable 2 at a high negative potential of the order of 1500 volts for the reasons abovementioned, but are transmitted with zero or less than 350 volts incidental D. C. component and with an amplitude which is, say, about 20 volts. The pulses 6, when transmitted through the condenser 5 or the transformer, if the latter be employed lose their D. C. component, but before the pulses are applied to the control electrode 7 the peaks of the pulses 6 are caused to assume a substantially fixed level of potential corresponding substantially to that of the high negative potential generated by the generator 4. For this purpose any suitable form of level setting circuit may be employed and in the example illustrated level setting is effected by means of a diode valve 12 the anode of which is connected to a charging condenser 13 and to a tapping point on the potential divider 10. The tapping point on the potential divider 10 is so chosen that the potential which the peaks of the pulses 6 are caused to assume is sufficiently negative to cause the pulses to black out the electron beam of the tube 8 during line and frame flyback periods, the beam being turned on by the portions 14 of the waveform during the scanning of the target electrode. Thus, the relatively low voltage waveform transmitted along the cable 2 can control the operation of the tube 8. The pulses 6 may be generated by a suitable generator indicated at 15 in the control unit 3 and the amplitude of the pulses is arranged to be adjustable by the operation of a control knob 16. Since the peaks of the pulses 7 before being applied to the control electrode 7 of the tube 8 are stabilised at a fixed potential which is sufficient to black-out the beam of the tube, it will be appreciated that by varying the amplitude of the pulses 6 such variation in amplitude does not affect the level of potential about which the peaks of the pulses 6 have been stabilised by the operation of the diode 12 but does cause the level of the portions 14 of the black out waveform to be varied with respect to the peaks of the pulses 6, as indicated by dotted waveform 14. Since it is the portions 14 of the waveform which turn on the electron beam variation of this level will control the beam current of the tube. Thus it will be appreciated that control of the beam current can be effected merely by adjusting the knob 16 at the control unit 3 without the necessity of transmitting such a high voltage along the cable 2.

If desired the black out waveform before having its level set as aforesaid can be used for other purposes in the camera, for example, for triggering the scanning circuits at the camera providing it is arranged that the pulses in the waveform always have a predetermined minimum amplitude. Also, if desired, a variable low voltage i. e., one less than 350 voltages may be superimposed on said waveform and separated at the camera and utilised for other control purposes.

What I claim is:

1. Television camera apparatus including a television camera connected by a cable to a control unit, means at the control unit for generating an electrical control signal having recurrent peak extremities and signal portions having a substantially constant value between recurrent peak extremities, means at the control unit for adjusting the amplitude of said signal and for transmitting said signal along said cable, means at the camera end of said cable for generating a high direct current voltge for operating the pick-up tube of said camera, means for isolating said high voltage from said cable and arranged to exclude the D. C. component from said control signal, a level setter subsequent to said last-mentioned means for setting the peaks of said signal at a fixed level corresponding substantially to said high direct current voltage and utilisation means at said camera responsive to variations in amplitude of said signal portions from the fixed level of said pulses due to said adjustment in amplitude to effect a control at the high voltage level of said source.

2. Television camera apparatus including a television camera connected by a cable to a control unit, means at said control unit for generating an electrical control signal having recurrent peak extremities forming pulses and signal portions having a substantially constant value between recurrent peak extremities, means at said control unit for adjusting the amplitude of said signal and for transmitting said signal along said cable, means at the camera end of said cable for generating a high direct current voltage, means for applying said high direct current voltage to one electrode of the pick-up tube of said camera, means at the camera end of said cable for isolating said high voltage from said cable and for excluding the D. C. component of said control signal, a unidirectionally conducting device having one electrode connected to said direct current voltage generating means and the other electrode connected to said cable between said isolating means and said pick-up tube to set the peaks of said signal at a fixed level corresponding substantially to said high direct current voltage, means for applying said pulses at said high direct current voltage to another electrode of said pick-up tube to black-out the beam of said tube and for applying to said last-mentioned electrode variations in amplitude of said signal portions from said fixed level due to said adjustment in amplitude to vary the beam current of said tube.

References Cited in the file of this patent

UNITED STATES PATENTS

| | | |
|---|---|---|
| 2,171,536 | Bingley | Sept. 5, 1939 |
| 2,252,746 | Willans | Aug. 19, 1941 |
| 2,295,059 | Smyth | Sept. 8, 1942 |
| 2,296,919 | Goldstine | Sept. 29, 1942 |
| 2,299,328 | Kell | Oct. 20, 1942 |
| 2,309,764 | Gottier | Feb. 2, 1943 |
| 2,426,710 | Sanders | Sept. 2, 1947 |
| 2,525,106 | Wendt | Oct. 10, 1950 |